A. H. LUCAS.
EGG BOXES.

No. 180,045. Patented July 18, 1876.

Witnesses:
M. C. Lunk
G. Theilkuhl

Inventor:
Andrew H. Lucas,
by Theodore Mungen.
Attorney.

UNITED STATES PATENT OFFICE.

ANDREW H. LUCAS, OF ST. LOUIS, MISSOURI.

IMPROVEMENT IN EGG-BOXES.

Specification forming part of Letters Patent No. 180,045, dated July 18, 1876; application filed June 6, 1876.

*To all whom it may concern:*

Be it known that I, ANDREW H. LUCAS, of St. Louis, in the county of St. Louis and State of Missouri, have invented a new and useful Improvement in Egg-Boxes; and I hereby declare that the following is a full, clear, and exact description of the same, reference being had to the accompanying drawing, forming a part of this specification, in which—

Figure 1:
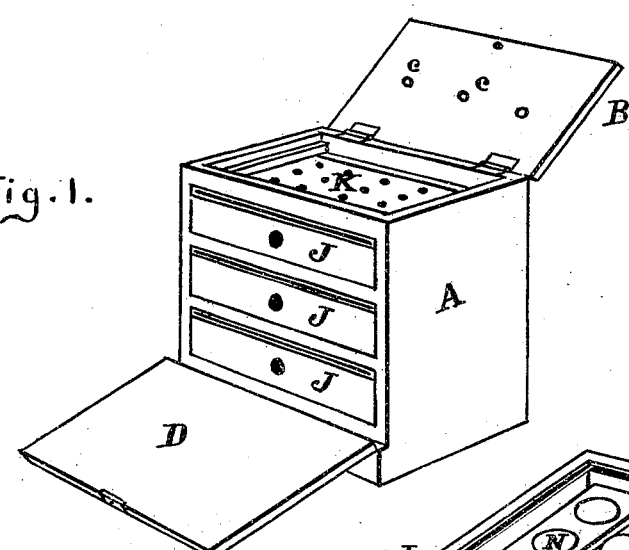
Figure 2:
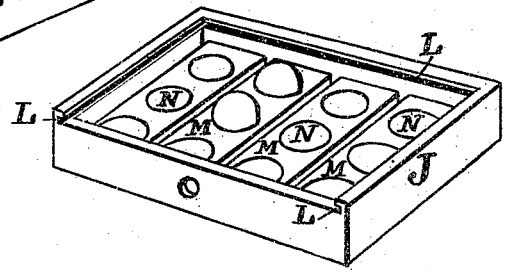
Figure 3:
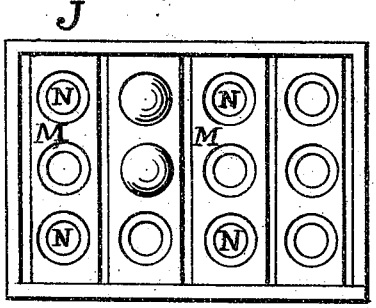
Figure 4:
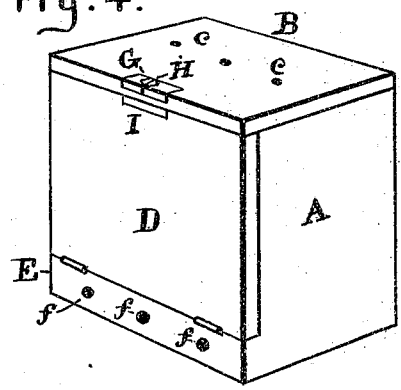
Figure 5:
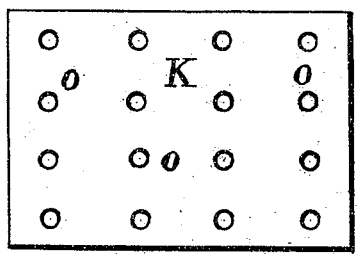
Figure 6:

Figure 1 is a perspective view of the egg-box, having the side and top opened. Fig. 2 is a perspective of one of the drawers. Fig. 3 is a plan view of one of the drawers. Fig. 4 is a perspective view of the box closed. Fig. 5 is a ventilated card-board that slides in a groove in the drawers, and over the eggs, to hold them in their places; and Fig. 6 is a view of the screw, swivel, and nut that fasten the top and front of the box when closed.

This invention relates to an improvement in egg-boxes; and consists, first, of a case, having a hinged perforated top and a hinged and perforated front, provided with a series of drawers having perforated stationary strips placed therein, so as to have intervals of space between them, the objects being to place the eggs upon end in the perforations in the stationary strips, and to permit air to circulate around the eggs through the spaces between the perforated stationary strips, for the purpose of keeping the eggs cool; secondly, of a drawer having perforated stationary strips placed therein, so as to have intervals of space between them, and provided with a groove in its ends and rear side to receive a perforated card-board, the objects being to receive the eggs and hold them in their places, all of which will be hereinafter more fully described and claimed.

In the accompanying drawings similar letters of reference indicate like parts of the invention.

A is the case; B, the hinged top perforated at $c\,c\,c$. D is the hinged front, which is hinged to a strip, E, perforated at $f\,f\,f$ at the bottom of the case A. The hinged top B is provided with a swivel-plate, G, and a screw, H. The hinged front D has the nut or screw-plate I secured to its upper edge. The series of drawers J are placed in the case A in the ordinary manner for inserting drawers in a case. The front side of the drawers J are slightly narrower than the ends and rear sides, to permit a perforated card-board, K, to be inserted in the grooves L made in the ends and rear sides of said drawers quite near their upper edges. The strips M in the drawers J are stationary, have intervals of space between them, and are provided with perforations or egg-receptacles N, in which the eggs are placed, points down. When the eggs have been placed in receptacles N the card-board K is inserted in the grooves L, and the perforations O in said card-board permit the circulation of air around the eggs, and at the same time hold them in place, and thus prevent the jarring motion of the case, when being shipped, from injuring or breaking the eggs, the drawers J, of course, having been previously inserted into the case A, and the latter closed and fastened ready for transportation. To fasten the case, the top and front should be closed, and the screw H driven to its place in the nut or screw-plate I. As the lowest drawer J can only be inserted into the case A above the strip E a kind of box is formed beneath said lower drawer J, and the air enters this box through the perforations $f\,f\,f$, circulates around the eggs through the spaces between the stationary strips M, and escapes through the perforations $c\,c\,c$ in the top of the case A, thus keeping up a constant circulation of fresh air around the eggs, and thus preserving them, either while stored or being shipped.

Having thus described my improvement, what I claim as new and useful, and desire to secure by Letters Patent of the United States, is—

1. The case A, having the hinged and perforated top B $c\,c\,c$, and hinged and perforated front D E $f\,f\,f$, in combination with the series of drawers J, having perforated stationary strips M N with intervals of space between them, substantially as and for the purposes set forth.

2. The drawer J, having the perforated stationary strips M N placed therein, so as to have spaces between them provided with the groove L, in combination with the perforated card-board K O, substantially as and for the purposes set forth.

ANDREW H. LUCAS.

Witnesses:
JOHN H. FAUPEL,
WM. F. SMITH.